(12) United States Patent
Oppermann

(10) Patent No.: US 9,134,483 B2
(45) Date of Patent: Sep. 15, 2015

(54) OPTICAL COUPLING SYSTEM HAVING AN OPTICAL COUPLER AND A LIGHT-TRANSMISSIVE EXTERNAL MEDIUM AND ALSO PRODUCTION AND USE OF SUCH A SYSTEM

(71) Applicant: Fraunhofer-Gesellschaft zur Förderung der angewandten Forschung e.V., München (DE)

(72) Inventor: Hans-Hermann Oppermann, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 14/137,246

(22) Filed: Dec. 20, 2013

(65) Prior Publication Data

US 2014/0254984 A1    Sep. 11, 2014

(30) Foreign Application Priority Data

Dec. 20, 2012    (DE) .......................... 10 2012 025 565

(51) Int. Cl.
*G02B 6/26* (2006.01)
*G02B 6/42* (2006.01)
*G02B 6/12* (2006.01)

(52) U.S. Cl.
CPC .. *G02B 6/26* (2013.01); *G02B 6/42* (2013.01); *G02B 6/4214* (2013.01); *G02B 2006/12176* (2013.01)

(58) Field of Classification Search
CPC .. G02B 6/4298; G02B 6/0031; G02B 6/0055; G02B 6/4214
USPC .................. 385/31, 38, 49–50, 88–94; 216/24
See application file for complete search history.

(56) References Cited

U.S. PATENT DOCUMENTS

| 6,904,197 | B2 | 6/2005 | Bhagavatula |
| 6,934,429 | B2 | 8/2005 | Kikuchi et al. |
| 6,939,058 | B2* | 9/2005 | Gurevich et al. ............... 385/93 |
| 6,973,248 | B2 | 12/2005 | Kropp |
| 7,379,639 | B2 | 5/2008 | Ozawa et al. |
| 8,548,284 | B2* | 10/2013 | Warashina et al. ............. 385/14 |
| 8,761,550 | B2* | 6/2014 | Tan et al. ......................... 385/14 |
| 2004/0067025 | A1* | 4/2004 | Haraguchi et al. ............. 385/49 |
| 2005/0281507 | A1 | 12/2005 | Kropp |
| 2007/0036512 | A1* | 2/2007 | Winston et al. ............... 385/147 |
| 2008/0175531 | A1 | 7/2008 | Fincato et al. |
| 2010/0142886 | A1* | 6/2010 | Warashina et al. ............. 385/14 |
| 2012/0069721 | A1* | 3/2012 | Nishida et al. ............. 369/13.33 |

FOREIGN PATENT DOCUMENTS

DE    10238741 A1    3/2004
DE    60304841 T2    11/2006

* cited by examiner

*Primary Examiner* — Ellen Kim
(74) *Attorney, Agent, or Firm* — Schwegman Lundberg & Woessner, P.A.

(57) ABSTRACT

An optical coupling system having an optical coupler and a light-transmissive external medium, the optical coupler comprising a light guide which extends parallel to a main plane of the optical coupler, a mirror surface which is inclined relative to the main plane by an angle of inclination and an outer surface of the coupler which abuts on the medium, the waveguide.

23 Claims, 10 Drawing Sheets

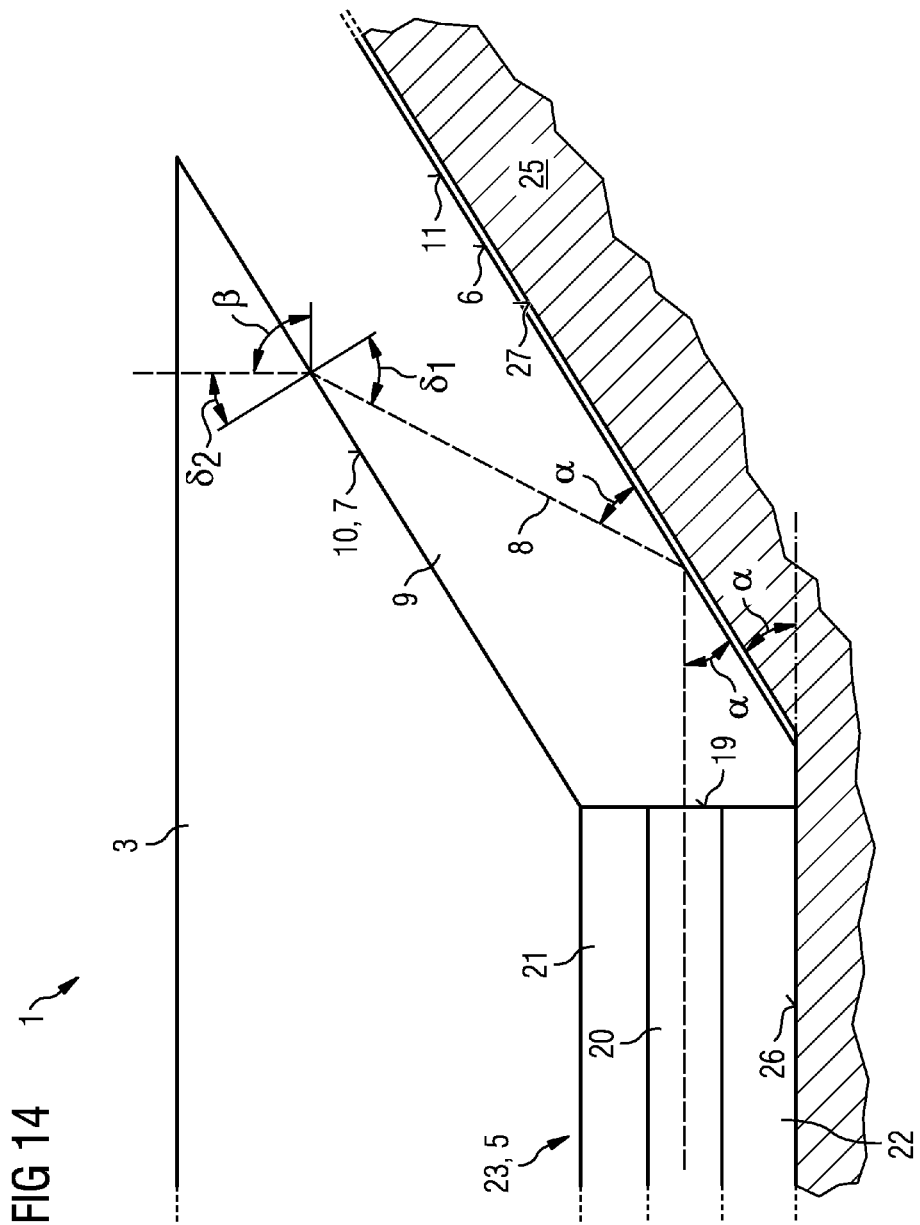

Figure 1:
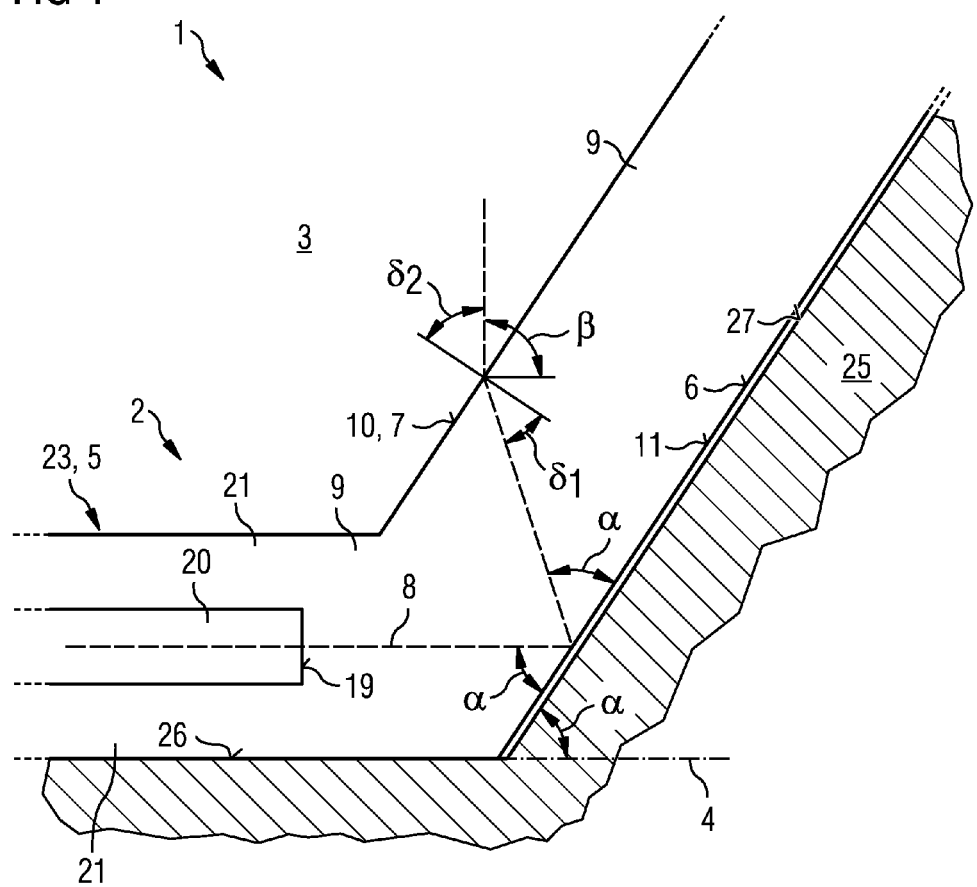

OPTICAL COUPLING SYSTEM HAVING AN OPTICAL COUPLER AND A LIGHT-TRANSMISSIVE EXTERNAL MEDIUM AND ALSO PRODUCTION AND USE OF SUCH A SYSTEM

CLAIM OF PRIORITY

This application claims the benefit of priority of German Patent Application Serial No. 10 2012 025 565.9, filed on Dec. 20, 2012, the benefit of priority of which is claimed hereby, and which is incorporated by reference herein in its entirety.

The invention relates to an optical coupling system having an optical coupler and a light-transmissive external medium. The invention relates in addition to a method for production and a method for use of such an optical coupling system.

Optical coupling systems are used in order to transmit light beams from one component to another, for example in the field of optoelectronics, in particular in optical communications, in computing and in optical sensor systems. There are possible as components, in particular optical and optoelectronic components, such as for example light guides, photodetectors and semiconductor lasers, in particular surface emitters (VCSEL), and also integrated optoelectronic circuits, in particular on a semiconductor basis.

The mentioned light beams are typically monochromatic or have for example exclusively wavelengths within a narrow wavelength range. Such light beans can be for example light beams of a laser source. The light beams can be pulsed for example (pulse-modulated). Further possible terms for the mentioned light beams are for example light signal or light impulse.

Light beams are typically guided in portions in light guides, the light guides often being disposed on surfaces of planar substrates or carriers. In the case of such "planar integrated" light guides, the problem then frequently arises of transmitting the light beams from the light guide perpendicular to the surface of the substrate or carrier towards another component or of beaming a light beam coming from the component in the reverse direction perpendicular to the surface of the substrate or carrier into the light guide (coupling-in).

For this purpose, the light beam is frequently deflected at a mirror surface integrated in the carrier, it being attempted to orientate the mirror surface at a 45° angle to the surface of the substrate in order to enable a perpendicular coupling-out or -in of the light beam. For this purpose, it is known for example to grind down the substrate from a lower side at a 45° angle or to machine it with a laser. It is also known to stamp a 45° plane into a polymer substrate and subsequently to metallise the latter. However, it is disadvantageous with these solutions that they are complex and expensive in production.

It is hence the object of the present invention to propose an optical coupling system which overcomes or at least reduces the portrayed problems of the state of the art. The optical coupling system should therefore be able to be produced as simply and economically as possible and, at the same time, to enable as precise a deflection as possible of the light beam by as far as possible exactly 90° relative to a surface on which the light guide is disposed. Furthermore, a corresponding production method for such a system is intended to be proposed, which can be implemented as simply and economically as possible and, at the same time, entails as low error tolerances as possible.

This object is achieved by an optical coupling system according to claim 1, by a production method for the optical coupling system according to claim 20 and by a use of the optical coupling system according to claim 23. Further developments and special embodiments result from the dependent claims.

Accordingly, the optical coupling system proposed here comprises an optical coupler and a light-transmissive external medium. The optical coupler comprises a light guide which extends parallel to a main plane of the optical coupler, a mirror surface which is inclined relative to the main plane by an angle of inclination ($\alpha$) and an outer surface of the coupler which abuts on or borders the medium. The waveguide, the mirror surface and the outer surface of the coupler are thereby orientated such that a light beam emerging from the light guide is reflected on the mirror surface and, at a coupling angle ($\beta$) defined relative to the main plane, exits through the outer surface from the coupler into the external medium. Of course, a beam course in an opposite direction is also possible. In the case of this arrangement, it is in addition possible, as a result of the reversibility of the beam path that, at the coupling angle, the light beam enters through the outer surface from the external medium into the coupler, is reflected on the mirror surface and subsequently is coupled into the light guide.

Between the mirror surface and the outer surface of the coupler, in addition a light-transmissive layer with an optical refractive index ($n_1$) is disposed such that the light beam, which emerges therefore either from the light guide or is coupled subsequently into the latter, is refracted and deflected at at least one of the interfaces of the layer, the angle of inclination ($\alpha$) and the optical refractive index ($n_1$) being chosen as a function of an optical refractive index ($n_2$) of the external medium such that the coupling angle ($\beta$) is in a range between 88° and 92°, preferably between 89° and 91°, particularly preferred between 89.5° and 90.5°. As stressed already above, also a beam course in an opposite direction is of course possible.

Here and subsequently, there is termed as angle between two intersecting (planar) surfaces or (straight) lines, respectively the smallest angle included by the surfaces or lines.

The concept underlying the invention is that the mentioned coupling angle ($\beta$) can also be within the mentioned angle ranges even if the angle of inclination ($\alpha$) deviates from 45°, for example by at least 1°, by at least 2°, by at least 5° or by an even greater deviation upwards or downwards, for example by up to 10°, by up to 15° or even by up to 20° upwards or downwards. For example the angle of inclination ($\alpha$) can be 25° or more or be 33° or more. Furthermore, the angle of inclination ($\alpha$) can be 65° or less or be 60° or less. For example, the angle of inclination ($\alpha$) can be between 40° and 60°.

The mentioned layer serves for the purpose of refracting and deflecting the light beam such that the desired coupling angle is achieved, although the angle of inclination ($\alpha$) is not equal to 45°, the strength of the refraction and deflection depending upon the optical refractive index ($n_1$). The coupling angle is therefore corrected by light refraction by means of the layer. If the angle of inclination ($\alpha$) has therefore a prescribed value which deviates from 45° and is for example between 40° and 60°, then, by means of a corresponding choice of the optical refractive index ($n_1$), for example by trying out various materials with different optical refractive indices for the mentioned layer, the desired coupling angle can be achieved. In general for different external optical media, if these differ from each other in their optical refractive indices, also different values are thereby obtained for the refractive index ($n_1$) of the layer. The refractive index ($n_1$) of the mentioned layer hence depends also upon the refractive index ($n_2$) of the given external medium.

The external medium can be for example a gas, for example air, and have a refractive index between 0.95 and 1.05. The external medium can also be a liquid or a solid material, for example a polymer, for instance with a refractive index ($n_2$) between 1 and 2, in particular between 1.4 and 1.67, for example of for instance 1.4 or 1.41, or a glass, for example with a refractive index in a range between 1.4 and 2.2, in particular between 1.46 and 2.146, for example of for instance 2.14. Also possible are crystalline (or polycrystalline) materials which can be distinguished by very high refractive indices, such as for example 3.9 for PbS. The external medium can in principle also be a part of that optoelectronic component into which the light beam is coupled. Also for the first-mentioned layer and also for the further subsequently mentioned layers, each of the materials mentioned for the external medium is likewise possible. In the case of a gas for one of these layers, this can be achieved in production by the use of one or more sacrificial layers which for example are applied on the mirror surface and, in a subsequent method step, for example after applying the external medium on the sacrificial layer, are removed again and filled with the gas.

Preferably, all the materials through which the light beam passes, in particular the mentioned transparent layer and the external medium, are optically as homogeneous as possible, i.e. the optical properties (in particular the refractive index) do not change or as little as possible within these materials.

Finally, it is known that the optical refractive index of a light-transmissive material generally depends upon the wavelength ($\lambda$) of the light, i.e. is wavelength-dependent (dispersion). Hence the optical refractive index ($n_1$) can also depend upon the wavelength ($\lambda$) of the light beam. Preferably, the light beam is monochromatic with a given wavelength ($\lambda$) or has exclusively wavelengths ($\lambda_i$) within a narrow wavelength range. Then the claimed optical coupling system has at least the ability to couple-out or -in such light beams within the mentioned ranges of the coupling angle, as described. The indicated values of refractive indices then relate respectively to the wavelength(s) of the used or defined light beam. Typical values of the wavelength $\lambda$ are for example 850 nm, 1,310 nm and 1,550 nm in optical communications, therefore here are within a range of approx. 750 nm to 1,750 nm. For applications in sensor systems, wavelengths $\lambda$ in a range between 300 nm (for example for UV sensors) and 5,000 nm (for example for IR sensors) are possible.

Preferably, the mirror surface and the outer surface respectively have a planar configuration. In a particularly simple embodiment of the system, the outer surface and the mirror surface extend parallel to each other.

Simplification of the system is obtained in addition when the at least one of the external interfaces of the transparent layer, at which the light beam is refracted and deflected, are orientated parallel to the mirror surface. Preferably the mentioned layer has two interfaces, one of which is orientated towards the outer surface and one towards the mirror surface. Typically, the light beam passes through at least the interface orientated towards the outer surface and is refracted and deflected there. If the interface orientated towards the mirror surface does not abut directly in a planar or areal manner on the mirror surface, then the light beam typically also passes through this interface and is (likewise) refracted and deflected there. In a special embodiment, the mentioned layer abuts on i.e. borders the outer surface and/or on the mirror surface in a planar or areal i.e. extensive manner, namely with the respective interface orientated towards it.

It is also possible that the layer is part of a layer arrangement which comprises further (i.e. one or more) transparent layers, the layer arrangement bordering on i.e. bordering the outer surface and on the mirror surface respectively in a planar or areal manner, the layers of the layer arrangement, i.e. the first-mentioned layer and the further layers, having respectively two outer interfaces which extend parallel to the mirror surface and to the outer surface. In a simple embodiment, the layer arrangement consists exclusively of these layers. Surprisingly, it can be achieved in this case that the coupling angle ($\beta$) of the light beam is independent of the refractive indices of the further layers since the refraction- and deflection effects of these layers ultimately are compensated for mutually with respect to the coupling angle ($\beta$). This is the case in particular when the light beam is irradiated from the light guide into the first-mentioned layer without previously passing through one of the further layers of the layer arrangement.

Subsequently, the first-mentioned layer is also termed in brief "the layer".

The light guide can be orientated for example to beam the light beam through a further outer interface of the layer into this layer, the further outer interface being orientated towards the light guide and preferably abutting directly on i.e. bordering directly the light guide or a waveguide core of the light guide. Typically, this further interface is disposed between the two first-mentioned interfaces of the layer which are orientated towards the outer surface or the mirror surface. Preferably, no refraction and deflection of the light beam is effected at this interface. This can be achieved for example by this further interface between the light guide or the waveguide core and this layer being orientated perpendicular to a local beam axis of the light beam, i.e. the light beam impinging vertically on this further interface. Refraction and deflection at this further interface can however also be precluded by a waveguide core of the light guide, which guides the light beam, having a refractive index which is the same as the refractive index of the layer, as described further on.

A further simplification of the optical coupling system can be achieved by the light guide being orientated to emit the light beam parallel to a plane spanned by a surface normal of the main plane and a surface normal of the mirror plane, typically in a direction pointing towards the mirror surface.

It can be achieved as a result of the mentioned simplifications that, by means of a simple correlation between the optical refractive index ($n_1$), the first-mentioned layer, the optical refractive index ($n_2$) of the external medium and the angle of inclination ($\alpha$), it can be calculated what refraction angle ($n_1$) is required in order that the coupling angle is within the desired range. The required refractive index ($n_1$) of the layer can then be determined by means of this correlation so that finding a suitable material for the layer is even easier, the material for the layer being able however to be implemented likewise without difficulty at given values of the optical refractive index ($n_2$) of the external medium and of the angle of inclination ($\alpha$) since the coupling angle obviously always depends upon the refractive index ($n_1$) (as also upon the parameters $n_1$ and $\alpha$). The mentioned correlation between the optical refractive index ($n_1$) of the first-mentioned layer, the optical refractive index ($n_2$) of the external medium and the angle of inclination ($\alpha$) is (in the easiest case)

$$n_1/n_2 = \tan(\alpha),$$

using Snell's law $n_1 * \sin(\alpha_1) = n_2 * \sin(\alpha_2)$. It is possible in particular that the light guide comprises a waveguide core which guides the light beam (as mentioned already above) and also at least one outer layer which abuts on the waveguide core at the side, an optical refractive index of the waveguide core being greater than the optical refractive index (or than the optical refractive indices) of the at least outer layer so that the light beam can be reflected by the outer layer by means of total reflection back into the waveguide core. In the simplest case, it is possible that the light guide has precisely one outer layer made of a single material in which the waveguide is embedded. However, it is also possible in principle that the light guide has a plurality of outer layers in which the waveguide core is embedded, for example an outer layer which is disposed between the waveguide core and a substrate which carries the light guide, and also further outer layers disposed above this outer layer. These outer layers can have the same or different refractive indices which however must be respectively less than the refractive index of the waveguide core. As described further on, these outer layers and also the waveguide core can end in front of the mirror surface or extend beyond this as layers of the above-described layer arrangement. Within the light guide, the light beam extends, because of the total reflection of the light beam at the interface between waveguide core and outer layer, mainly in the waveguide core. In the case of total reflection at this interface, the light beam generally penetrates into the outer layer only with a very small penetration depth. Provided that this has a sufficient thickness, typically at least a few wavelengths of the light beam, i.e. typically at least 1 to 10 µm, then lateral emergence of the light beam through the outer layer from the light guide is prevented. Then further layers which abut laterally on the light guide, i.e. on the outer layers, can then be disposed outside the light guide. Such a layer abutting laterally on the light guide can have any optical refractive index, in particular even a refractive index which is smaller or greater than the refractive indices of the outer layers or than the refractive index of the waveguide core. This layer can consist for example of the same material as the first-mentioned layer and can also abut on this or merge into this, cf. layer 9 in FIG. 2.

For example, the optical refractive index of the waveguide core can be the same as the optical refractive index ($n_1$) of the layer, as described above already. Alternatively, it is also possible that the optical refractive index of one of the at least one outer layer is the same as the optical refractive index ($n_1$) of the layer. In the first case, the layer can be a continuous continuation/extension of the waveguide core which starts from the waveguide core, in the second case, a continuous continuation/extension of the relevant outer layer which starts from the relevant outer layer. In the first case, also the outer layer which is disposed between the waveguide core and the surface of the carrier is typically likewise continued continuously, as a further layer of the above-described layer arrangement between the mirror surface and the first-mentioned layer. In order furthermore to enable, in the first case, coupling-out of the light beam from the waveguide core through this outer layer, it is typically required that the angle of inclination ($\alpha$) is greater than a critical angle ($\theta_c$) of the total reflection between the waveguide core and this outer layer, which depends, in the known manner, upon the refractive indices of this outer layer and the waveguide core. In this way, the waveguide core has such a great inclination at a transition to the mirror surface (for example from the first to the second surface region, see below) that the light beam emerges at this point from the waveguide core since no total reflection can take place because of the inclination.

In a possible further embodiment, the light guide has an end piece which points towards the mirror surface and on which the light guide ends and from which the light beam emerges from the light guide or into which the light beam enters into the light guide. On this end piece, at least the waveguide core of the light guide therefore ends. This end piece is typically orientated parallel to the main plane. In this as also in other embodiments, the waveguide core typically does not abut on the mirror surface.

The at least one outer layer can for example consist of or be manufactured from a glass or a polymer. The waveguide core can also consist of or be manufactured from a glass, such as for example SiON or SiN, or a polymer.

In the case of the proposed method for using an optical coupling system of the type proposed here, it is correspondingly provided that, according to the coupling direction,
  a light beam which emerges from the light guide is irradiated into the layer and, in its further beam course, is reflected on the mirror surface, the light beam, in its beam course, being refracted and deflected at at least one of the outer interfaces of the layer and subsequently emerging through the outer surface from the optical coupler into the external medium, or that
  a light beam which includes the mentioned coupling angle with the main plane is irradiated through the outer surface into the optical coupler, the light beam, in its subsequent beam course, being refracted and deflected at at least one of the outer interfaces of the layer, the light beam being reflected on the mirror surface and subsequently being coupled into the light guide.

The features described above and subsequently of a special embodiment of the coupling system are transferred correspondingly also to this method. The following beam courses are possible in the case of use of the optical coupling system according to requirements:

Firstly, the light beam passes from the light guide into the layer. This is effected preferably without refraction/deflection of the light beam by the waveguide core and the layer having the same refractive indices (for example consisting of the same material) or by the light beam impinging vertically on an interface between light guide and layer. If the layer abuts directly on the mirror surface, deflection of the light beam by this layer is effected only by a single interface of the layer which is orientated towards the outer surface and extends preferably parallel to the mirror surface. If the layer does not abut directly on the mirror surface, then refraction and deflection of the light beam is also effected at a further interface of the layer which is orientated towards the mirror surface and preferably parallel thereto. If further parallel layers are disposed between the layer and the mirror surface and/or between the layer and the outer surface, then further refractions and deflections are effected also at interfaces of these further layers, the effects of which are however compensated for (because of the parallel orientation to the mirror surface and outer surface) with respect to the coupling angle of the light beam. Finally, the light beam emerges from the optical coupler through the outer surface into the external medium, the outer surface extending preferably parallel to the mirror surface and abutting on the layer or the further layers.

The optical coupler can have a carrier, the surface of which comprises a first surface region disposed parallel to the main plane and a second surface region disposed parallel to the mirror surface. It is possible for example that the light guide has a first layer which is configured as waveguide core and one or more further outer layers which abut on the waveguide core. These layers can be disposed or applied on the first surface region. However, it is also possible that these layers extend also over further surface regions of the surface of the carrier, for example also over the second surface region. The second surface region can be metal-coated, for example by means of a metallic layer which is disposed or applied on the second surface region. Then this metal-coating or this layer is or forms the mirror surface of the optical coupler.

In a special embodiment, the first surface region of the carrier abuts on the second surface region.

The mentioned carrier can furthermore have a third surface region which extends parallel to the first surface region (and hence also parallel to the main plane) and is raised relative thereto, the height of the surface region being measured perpendicularly to the first surface region in the direction of the outer surface. The carrier can have in addition a fourth surface region which is inclined relative to the main plane and which is disposed between the first and the third surface region and abuts on the first and third surface region. The raised third surface region can in addition also abut on the second surface region. The light guide can extend beyond each of the mentioned surface regions, the light guide can therefore extend in particular beyond the first, third and fourth surface region continuously and possibly likewise also beyond the second surface region.

Such surface regions can be produced for example by the carrier having, in its surface, a, for example truncated pyramid-shaped, depression which tapers preferably into the carrier, a base of the (truncated pyramid-shaped) depression being the first surface region and a side face of the (truncated pyramid-shaped) depression being the second surface region. A further side face can comprise the above-mentioned fourth surface region. The third surface region can abut for example circumferentially on an upper edge of the depression.

It is also possible that the carrier, on its surface, has a, for example truncated pyramid-shaped, raised portion, the first surface region abutting on the raised portion and a side face of the raised portion being the second surface region.

The carrier can be a crystalline substrate, for example a silicon substrate, or a polymer substrate. The main plane can extend for example parallel to a first lattice plane of the crystalline substrate, for example parallel to a [110] lattice plane of the silicon substrate. The mirror surface can extend parallel to a second lattice plane of the crystalline substrate, for example parallel to a [111] lattice plane of the silicon substrate. In this case, the angle of inclination ($\alpha$) is typically 54.7°. The use of lattice planes in the definition of the angle of inclination ($\alpha$) has the advantage that the angle of inclination ($\alpha$) can be produced in a highly precise and very readily reproducible manner, for example applying anisotropic etching methods and possibly subsequent shaping methods, for instance in the case of a polymer substrate. In this way, for example the above-mentioned depression and also the above-mentioned raised portion can be produced in the crystalline substrate and also in the polymer substrate (subsequently by shaping of the crystalline substrate).

Correspondingly, the method proposed here for the production of an optical coupling system of the type proposed here provides that, for the production of the mirror surface which is inclined relative to the main plane, the surface of a crystalline substrate, for example of a silicon substrate, is processed by means of an anisotropic etching so that a first planar surface region of the crystalline substrate extends parallel to a first lattice plane of the crystalline substrate and a second surface region which abuts on the first surface region extends parallel to a second lattice plane of the silicon substrate. The first lattice plane can thereby be for example a [110] lattice plane and the second lattice plane a [111] lattice plane.

Furthermore, it is possible that the crystalline substrate is used as carrier of the optical coupler. However, it is also possible that a polymer substrate is shaped from a matrix, the matrix being the crystalline substrate or the matrix itself having been shaped from the crystalline substrate. The shaping can be effected for example by casting or imprinting of the crystalline substrate or the matrix. The polymer substrate which is reshaped using the crystalline substrate is subsequently used as carrier for the optical coupler. Further reshaping methods are for example hot-embossing and nano-imprint. The light guide and also one, several or all of the layers mentioned here, i.e. the waveguide core, the at least one outer layer, the first-mentioned layer and/or the further layers of the mentioned layer arrangement, can be produced advantageously by applying known deposition methods, such as for instance sputtering, and/or etching methods to the carrier with the first and the second surface region. In this way, a particularly precise relative orientation and arrangement of these layers, in particular of the light guide relative to the mirror surface, can be effected. In addition, it is possible to dispose the light guide particularly closely below the outer surface so that the optical coupler, on the one hand, can have only a low height. On the other hand, a spacing relative to the component into which the light beam is irradiated can thus advantageously be kept very narrow so that only a small beam widening and a high coupling efficiency can be achieved. In the case of a reversed beam direction (irradiated from the component into the optical coupler), corresponding advantages are achieved.

In addition, the optical coupling system can comprise:
an optoelectronic or optical component which is connected to the optical coupler and is disposed relative to the outer surface of the optical coupler such that the light beam coming from the optical coupler is coupled into the component or such that a light beam coming from the optoelectronic component is coupled into the optical coupler, or a further optical coupler of the type proposed here, the further optical coupler being orientated relative to the first-mentioned coupler such that the light beam enters through the outer surface of the further optical coupler into the further coupler, impinges on the mirror surface of the further coupler, is reflected on this mirror surface and the light beam reflected on this mirror surface is irradiated into the light guide of the second optical coupler.

The external medium can be disposed between the outer surface of the optical coupler and an outer surface of the optoelectronic or optical component which is orientated towards the optical coupler, the external medium filling an intermediate region defined by these outer surfaces preferably completely. In such an arrangement, the external medium can also be termed intermediate medium of the system.

The optoelectronic component can be a surface emitter, for example a VCSEL, or a photodetector. Furthermore, an optical lens element can be provided, for example for bundling the light beam passing through the outer surface of the optical coupler. For this purpose, the lens element can abut for example directly on the outer surface of the optical coupler and in this way represent the external medium. The respective component can be mounted for example by means of flip-chip mounting on the optical coupler or on the carrier.

Figure 9:
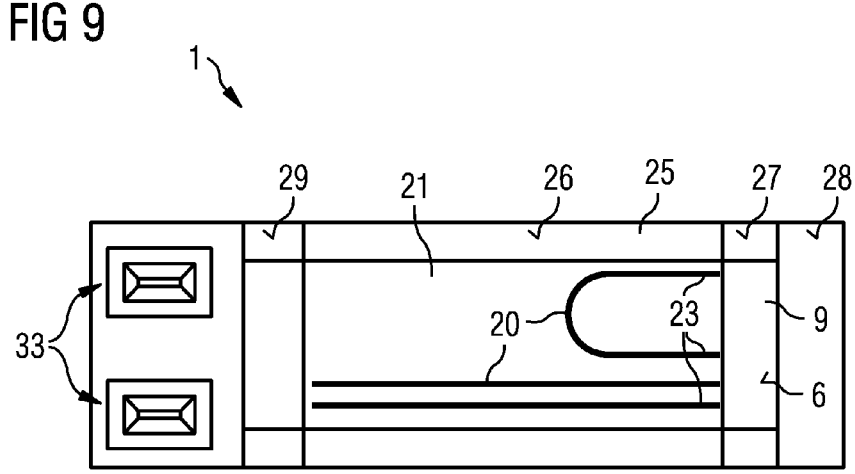
Figure 10:
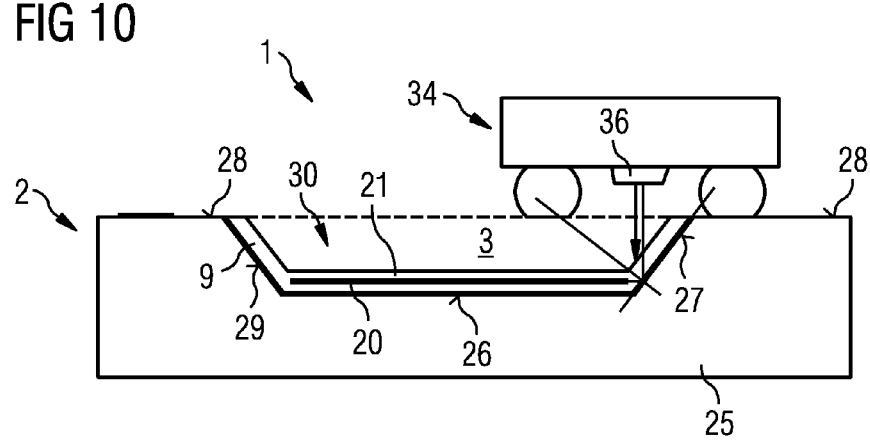
Figure 11:
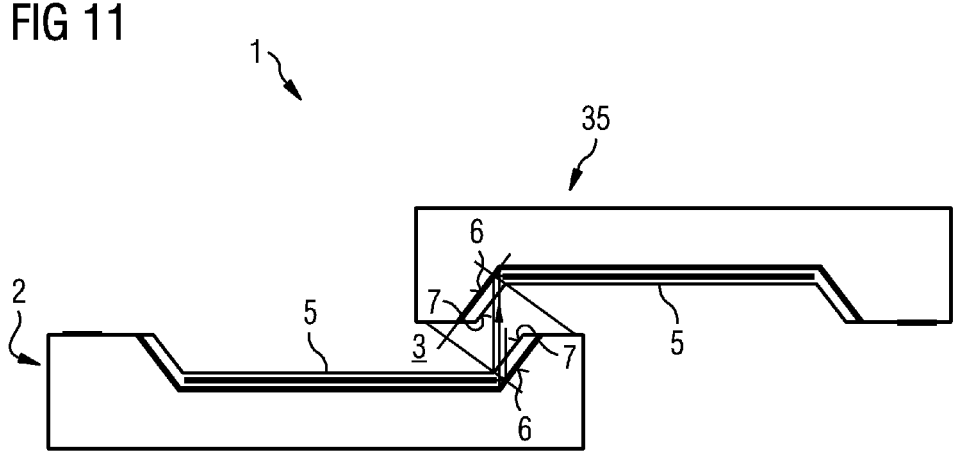
Figure 12:
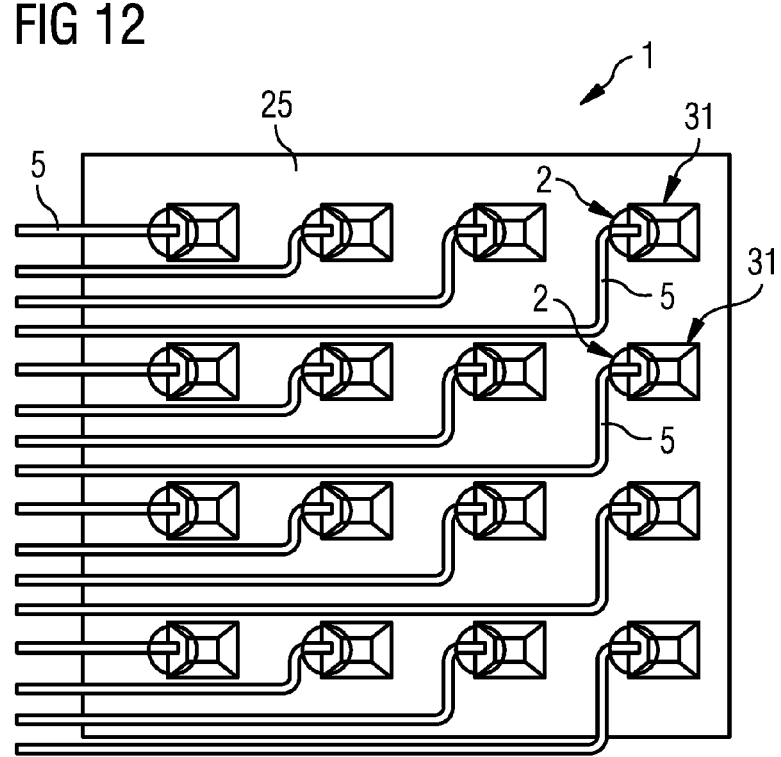
Figure 13:
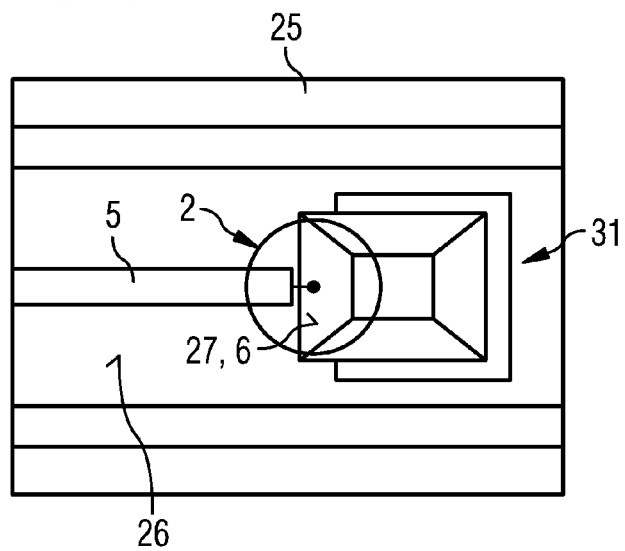

The invention is explained subsequently in more detail with reference to the special embodiments represented schematically in FIGS. 1 to 13. There are shown:

FIGS. 1-4 partial views of cross-sections through optical coupling systems of the type proposed here, FIGS. 5-8 cross-sections through the optical coupling system shown in FIG. 1, in various stages of the production thereof, FIG. 9 the optical coupling system shown in FIG. 1 in a view from above, FIG. 10 a cross-section through the optical coupling system, shown in FIG. 9, with an optoelectronic component, FIG. 11 a cross-section through the optical coupling system, shown in FIG. 9, with a further optical coupler of the type proposed here, FIG. 12 an optical coupling system of the type proposed here in a view from above and FIG. 13 an enlarged section of FIG. 12, FIG. 14 a cross-section through an optical coupling system of the type proposed here.

In the Figures, the same or mutually corresponding features are provided with the same reference numbers.

In FIGS. 1 to 4, partial views of cross-sections through four different special examples of optical coupling systems 1 of the type proposed here are represented schematically. Firstly, the example shown in FIG. 1 is described. The examples shown in FIGS. 2-4 and 14 are explained with reference to their differences relative to the example shown in FIG. 1.

Figure 2:
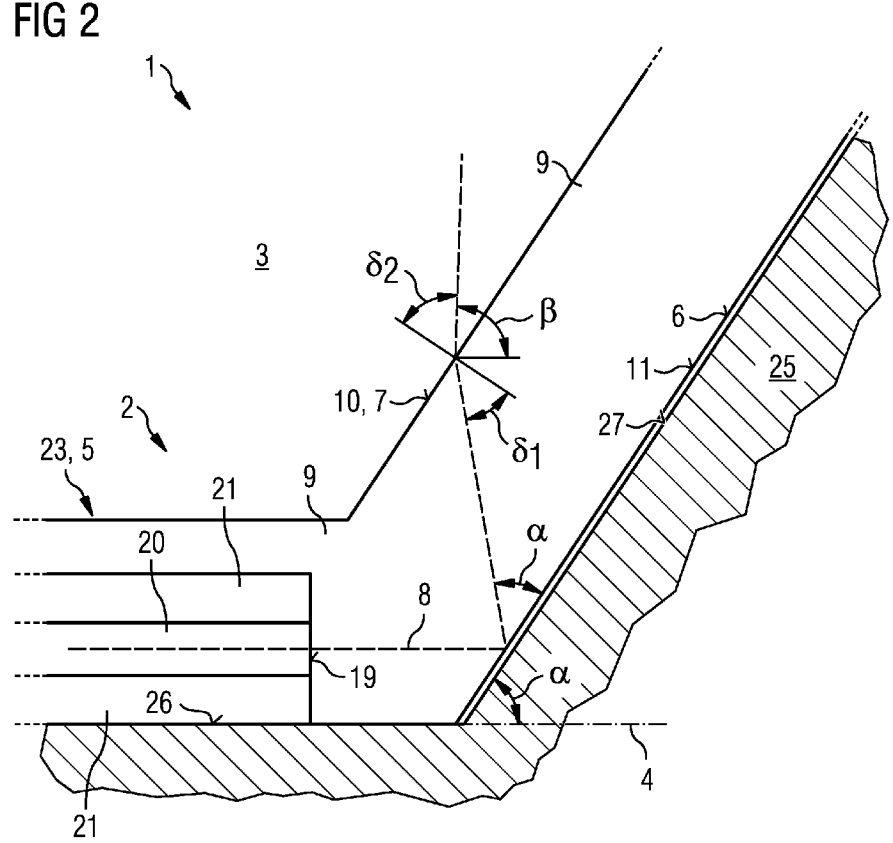
Figure 3:
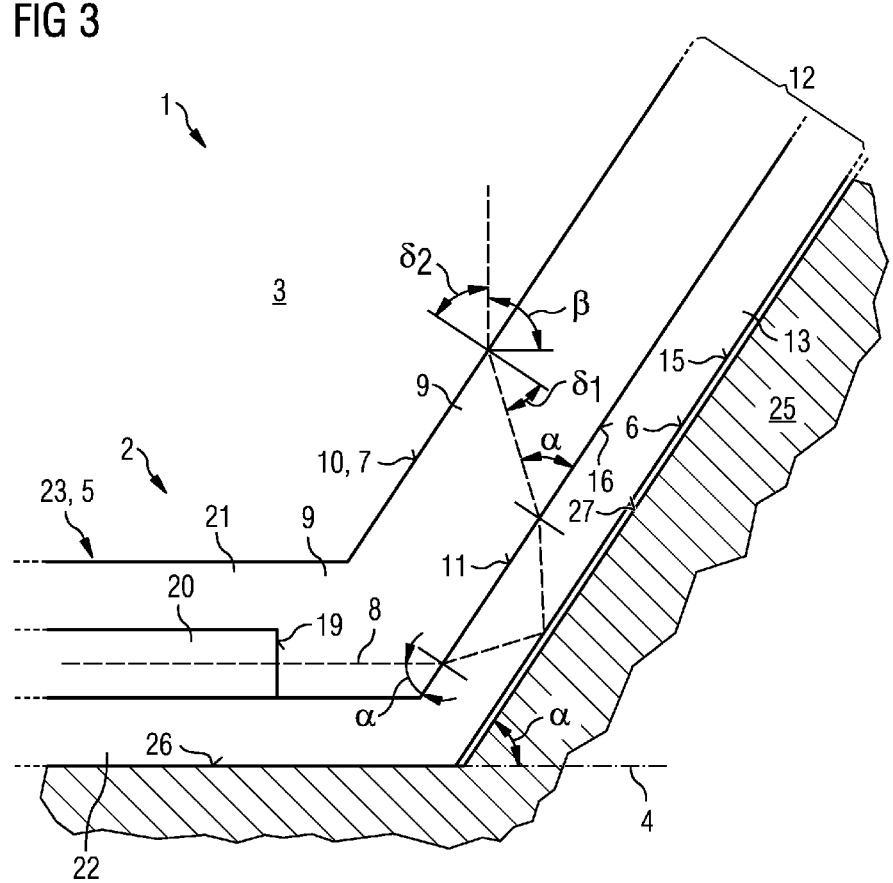
Figure 4:
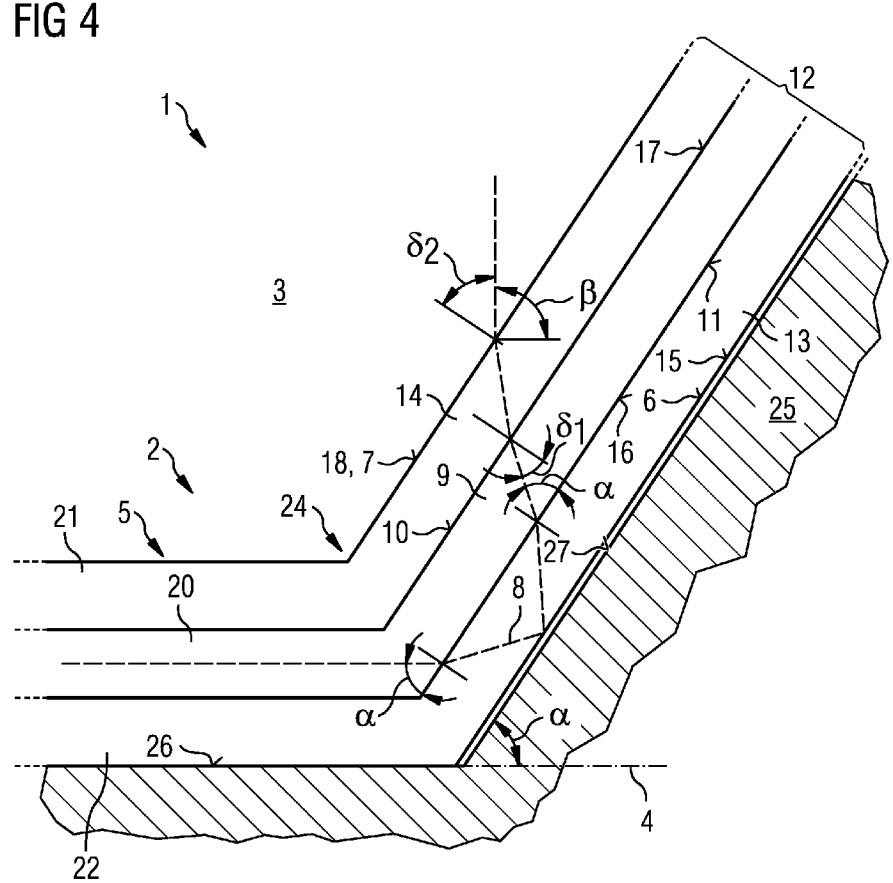
Figure 5:
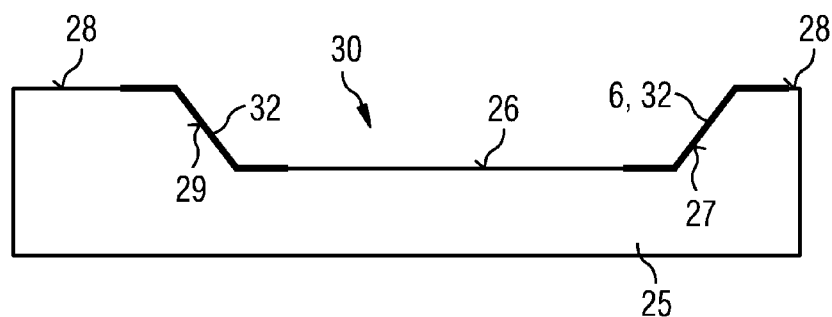
Figure 6:
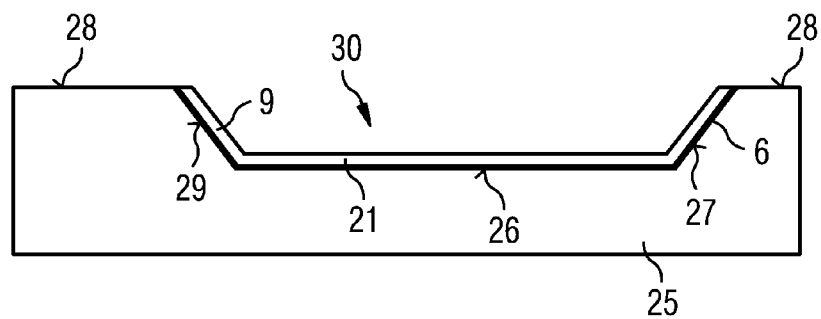
Figure 7:
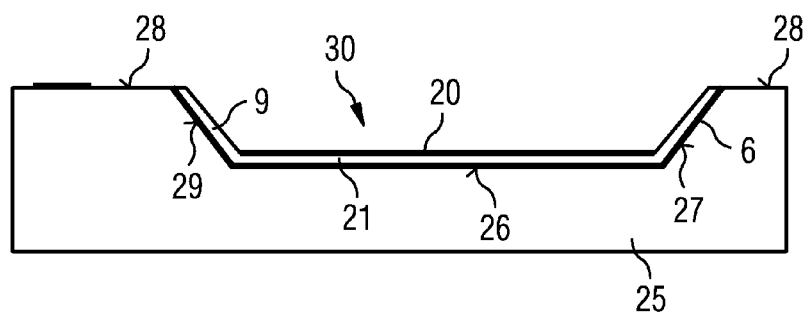
Figure 8:
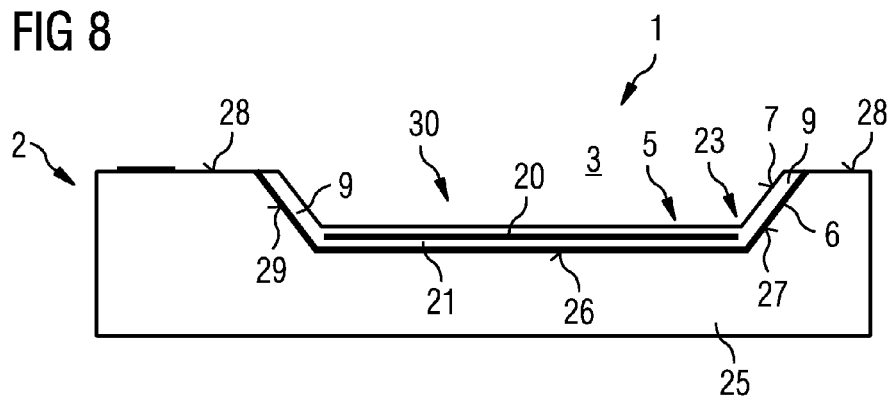

The optical coupling system 1 shown in FIG. 1 comprises, just like the coupling systems 1 shown in FIGS. 2-4, an optical coupler 2 and a light-transmissive external medium 3. The optical coupler 2 comprises a light guide 5 which extends parallel to a main plane of the optical coupler, a mirror surface 6 which is inclined relative to the main plane 4 by an angle of inclination α and an outer surface 7 of the coupler 2 which abuts on the medium 5. The waveguide 5, the mirror surface 6 and the outer surface 7 of the coupler 2 are thereby orientated such that a light beam 8 emerging from the light guide 5 is reflected on the mirror surface 6 and, at a coupling angle β defined relative to the main plane, emerges through the outer surface 7 from the coupler 2 into the external medium 3. Of course, a beam course in an opposite direction is also possible.

Between the mirror surface and the outer surface of the coupler, a light-transmissive layer 9 with an optical refractive index ($n_1$) is disposed in addition such that the light beam 8 emerging from the light guide 5 is refracted and deflected at at least one of the outer interfaces 10, 11 of the layer 9, the angle of inclination (α) and the optical refractive index ($n_1$) being chosen as a function of an optical refractive index ($n_2$) of the external medium 3 such that the coupling angle (β) is in a range between 88° and 92°, preferably between 89° and 91°, particularly preferred between 89.5° and 90.5°. In this case, the coupling angle is 90°.

In the examples shown in FIGS. 1, 2 and 14, the light beam is refracted respectively at precisely one interface 10 of the layer 9. In these simple examples, this coincides with the outer surface 7. In the embodiments shown in FIGS. 3 and 4, the light beam is refracted respectively at precisely two interfaces 10 and 11 of the layer 9, the interface 10 being orientated towards the outer surface 7 and, in the case of the example shown in FIG. 3, coinciding with the outer surface. The interface 11 is orientated respectively towards the mirror surface 6 and extends parallel thereto. This interface 11 abuts directly on the mirror surface 6 in the examples shown in FIGS. 1, 2 and 14, but not in the examples shown in FIGS. 3 and 4 so that the light beam is refracted here.

In the examples shown in FIGS. 3 and 4, the layer 9 is part of a layer arrangement 12, the layer arrangement 12 abutting respectively on the outer surface 7 and on the mirror surface 6 in a planar manner. The layer arrangement consists of the layer 9 and also of at least one further layer 13, 14 which have respectively two planar outer interfaces 15-18 which extend parallel to the mirror surface 6 and to the outer surface 7. The coupling angle (β) of the light beam in these examples is independent of the refractive indices of the further layers 13, 14 since the refraction- and deflection effects of these layers 13, 14 are compensated for mutually with respect to the coupling angle (β). The light beam 8 is irradiated into the first-mentioned layer 9 from the light guide 5 without passing in advance through one of the further layers 13, 14 of the layer arrangement 12.

The concept underlying the invention is that the mentioned coupling angle (β) can then also be within the mentioned angle ranges if the angle of inclination (α) deviates from 45°, for example by 2° or more. For example, the angle of inclination (α) can be between 25° and 65°. In the examples shown in FIGS. 1 to 4, α=54.7°, as is explained in more detail further on. In FIG. 14, α=25°. The layer 9 serves for the purpose of refracting and deflecting the light beam 8 such that the desired coupling angle of 90° is achieved although the angle of inclination (α) is not equal to 45°. The external medium 3 can be for example a gas, for example air, and have a refractive index between 0.95 and 1.05. The external medium can also be a liquid or a solid material, for example a polymer, for instance with a refractive index between 1 and 2, for example of approx. 1.4 or 1.41.

In FIGS. 1 to 3, the layer can be for example a polymer or glass with $n_1$=1.41 and the external medium 3 air with $n_2$=1. In particular in the example shown in FIG. 2, the layer 9 could also be a glass with a much higher refractive index in order to enable a coupling angle of 90° even with greater values of α. For $n_1$=2.14, in the case where the external medium is air, a coupling angle of 90° with α=65° could be achieved. In the case of angles of inclination <45°, the layer 9 must generally have a lower refractive index than the external medium. In the case of an angle of inclination α>45°, this is in general precisely reversed, as for example is evident from the correlation $n_1/n_2=\tan(\alpha)$.

In the example shown in FIG. 14, α=25°. If a glass or polymer with $n_2$=2.14 is used as external medium 3, the material of the layer 9 can possibly be for example a gas, such as air, with $n_1$=1. In production, firstly a sacrificial material is applied on the mirror surface 6 and later, after applying the external medium on the sacrificial layer, is removed again. If, in the examples shown in FIGS. 1, 2, 3 and 14, a material with $n_1$=1.4 is used and, as external medium 3, a material with $n_2$=2.14, such as for instance a glass, then the result with α=33° is again β=90°. When using a polymer as external medium with $n_2$=1.67, the result with α=40° is in contrast the desired value β=90°. Typically, refractive indices for polymers are between 1.4 and 1.67, for glasses between 1.46 and 2.146. In the case of specific crystals, refractive indices up to 3.9 are possible (for PbS).

Relative to the examples shown in FIGS. 1 and 3, the examples shown in FIGS. 2 and 4 are distinguished by the layer 9 not having the function of an outer layer at the same time so that the refractive index $n_1$ here can generally be chosen to be higher so that there is often greater freedom of choice with respect to the external medium 3, in particular in the case of large angles of inclination α.

All materials through which the light beam 8 passes, in particular the mentioned transparent layer 9 and the external medium 3, and also possibly the layers 13, 14 of the layer arrangement 12 are optically homogeneous, i.e. the optical properties (in particular the refractive index) do not change within these materials.

In the present examples, the light beam is monochromatic and hence has a specific wavelength (λ), for example in a range between 300 nm and 1,300 nm, for example λ=600 nm. The mentioned refractive indices hence relate to this wavelength λ of the light beam 8. The illustrated optical coupling systems 1 hence have at least the ability of to couple-out or -in light beams of the wavelength λ within the mentioned ranges of the coupling angle, as described.

In the examples shown in FIGS. 1-3, the light guide 5 is orientated and configured to beam the light beam 8 through a further outer interface 19 of the layer 9 into this layer 9, the further outer interface 19 being orientated towards the light guide 5 and abutting directly against a waveguide core 20 of the light guide 5. This further interface 19 is disposed between the two first-mentioned interfaces 10, 11 of the layer 9. At the further interface 19, no refraction and deflection of the light beam is effected since this further interface 19 is orientated perpendicular to a local beam axis of the light beam, i.e. the light beam impinges vertically onto this further interface 19.

The light guide 5 is orientated furthermore to emit the light beam parallel to a plane (corresponding to the drawing plane) which is spanned by a surface normal (not illustrated) of the main plane 4 and by a surface normal (not illustrated) of the mirror surface 6 in a direction pointing towards the mirror surface.

In addition to the light-guiding waveguide core 20, the light guide 5 consists in addition of at least one outer layer 21, 22 which abuts laterally on the waveguide core, an optical refractive index of the waveguide core being greater than the optical refractive index (or than the optical refractive indices) of the at least one outer layer 21, 22 so that the light beam can be reflected back by the outer layer 21, 22 by means of total reflection into the waveguide core 20.

In the examples shown in FIGS. 1 and 2, the light guide comprises precisely one outer layer 21 made of a single material in which the waveguide core 20 is embedded. In the examples shown in FIGS. 3 and 4, the light guide 5 comprises a plurality of outer layers 21, 22 in which the waveguide core 20 is embedded. These outer layers can have the same or different refractive indices, which however must be respectively smaller than the refractive index of the waveguide core.

In the examples shown in FIGS. 1 and 3, the outer layer 21 and the layer 9 is a single continuous layer and consists of a single material, the outer layer 22 in FIG. 3 merging continuously into the further layer 13 of the layer arrangement 12 and consisting of the same material as the latter. In the example shown in FIG. 2, the layer 9 is different from the outer layer 21 and, apart from the mirror surface 6, also covers the light guide 5. In the example shown in FIG. 4, the outer layers 21 and 22 are continued likewise over the mirror surface 6, merge continuously into the layers 13 and 14 of the layer arrangement 12 and are respectively formed from the same materials as these, the waveguide core 20 in this example merging continuously into the layer 9 and consisting likewise of the same material as this.

In the examples shown in FIGS. 1-3, the light guide 5 therefore ends before reaching the mirror surface 6, i.e. has an end piece 23 here, whilst the light guide 5 in the example shown in FIG. 4 is continued over the mirror surface 6 and also extends beyond this. In order, in this example, to enable coupling-out of the light beam from the waveguide core 20, through the outer layer 22 or 13, it is necessary that the angle of inclination (α) is greater than a critical angle ($\theta_c$) of the total reflection between the waveguide core 20 and this outer layer 22 or 13, which depends, in the known manner, upon the refractive indices of this outer layer 22 or 13 and the waveguide core 20. In this way, the waveguide core 20 has such a great curvature 24 that the light beam 8 at this point emerges from the waveguide core 20 (and no total reflection takes place).

The at least one outer layer 21, 22 can for example consist of or be manufactured from a glass or a polymer. The waveguide core 20 can also consist or be manufactured from a glass, such as for instance SiON or SiN, or a polymer.

In the illustrated examples (because of the arrangement of the interfaces), the following simple correlation between the optical refractive index ($n_1$) of the first-mentioned layer 9, the optical refractive index ($n_2$) of the external medium 3 and the angle of inclination (α) exists so that it can be calculated in advance what refractive index ($n_1$) is required in order that the coupling angle is in the desired range $$n_1/n_2 = \tan(\alpha)$$

This correlation results from the dependencies of the angles $\delta_1 \delta_2$, α and β, which are illustrated in FIGS. 1-4 and 14, $\delta_1$ and $\delta_2$ being passage angles of the light beam 8 through the respective interfaces (with respect to the surface normal of the interface). From the condition β=90°, there follows from geometric observations $\delta_2 = \alpha$ and $\delta_1 = 90° - \alpha$. When using Snell's law, $n_1 * \sin(\alpha_1) = n_2 * \sin(\alpha_2)$, and making use of the fact that the layer which is passed through is plane-parallel, the above correlation results. In the example shown in FIG. 4, the refractive index $n_1$ corresponds to that of the waveguide core 20, whilst the refractive index $n_1$ in the examples shown in FIGS. 1 and 3 corresponds to the refractive index of the outer layer 21. In the example shown in FIG. 2, the refractive index $n_1$ can be chosen to be independent of the refractive indices of the waveguide core 20 and of the outer layers 22 (in the case of the described orientation of the interface 19 perpendicular to the light beam 8). In the examples shown in FIGS. 2 and 4, the refractive index $n_1$ can hence be chosen advantageously large so that sufficient correction of the coupling angle β for many different materials and refractive indices $n_2$ of the external medium 3 can be achieved.

The optical coupler 2 shown in FIG. 1 has a carrier 25, the surface of which comprises a first surface region 26 which is disposed parallel to the main plane 4 and a second surface region 27 which is disposed parallel to the mirror surface 6, the first surface region 26 abutting on the second surface region 27. Each of the optical couplers 2 shown in FIGS. 2-4 likewise has a carrier 25 which is identical to that of the example shown in FIG. 1.

A special embodiment of the production method proposed here is described subsequently with reference to FIGS. 5-8. It is suitable for producing the embodiment of the optical coupling system 1 shown in FIG. 1. By means of corresponding modifications to the method, also the embodiments shown in FIGS. 2-4 or others can be produced.

In FIGS. 5-8, a cross-section through the carrier 25 is represented schematically. In addition to the first and the second surface region 26, 27, the surface of the carrier has in addition a third surface region 28 which extends parallel to the first surface region 26 (and hence also parallel to the main plane 4) and is raised relative to the latter, the height of the surface regions 26, 28 being measured perpendicular to the first surface region 26 in the direction of the outer surface. The carrier 25 has in addition a fourth surface region 29 which is inclined relative to the main plane 4 and is disposed between the first and the third surface region 26, 28 and which, just like the second surface region 27, abuts on the first and third surface region 26, 28.

The carrier 25, in its surface, has hence a, for example truncated pyramid-shaped, depression 30 which tapers into the carrier 25, base of the depression 30 being the first surface region 26 and a side face of the depression 30 being the second surface region 27. A further side face is the fourth surface region 29. The third surface region 38 abuts circumferentially on an upper edge of the depression 30.

However, it is in principle also possible that the carrier 30, on its surface, has a, for example truncated pyramid-shaped, raised portion 31 (cf. FIGS. 12 and 13), the first surface region 26 abutting on the raised portion 31 and a side face of the raised portion 31 being the second surface region 27.

The carrier 25 in this example is a crystalline substrate, for example a silicon substrate, but could in principle also be a polymer substrate. The main plane 4 extends parallel to a first lattice plane (not illustrated) of the crystalline substrate, for example parallel to a [110] lattice plane of the silicon substrate. The mirror surface 6 extends parallel to a second lattice plane of the crystalline substrate, for example parallel to a [111] lattice plane of the silicon substrate. In this way, the angle of inclination ($\alpha$) is prescribed because of the lattice structure of the substrate, in the present example at 54.7°.

In the mentioned special production method, for production of the surface regions 26-29 and in particular of the mirror surface 6 which is inclined relative to the main plane 4, the surface of the crystalline substrate, for example of the silicon substrate, is processed by means of anisotropic etching so that the first (planar) surface region of the crystalline substrate extends parallel to the first lattice plane of the crystalline substrate and the second surface region 27 which abuts on the first surface region 26 extends parallel to the second lattice plane of the silicon substrate.

Instead of using the crystalline substrate as carrier 25, it is however also possible, as for example in the embodiments shown in FIGS. 12 and 13, that a polymer substrate is used as carrier. This can be shaped from a matrix, the matrix being able to be the crystalline substrate. In the present example, the truncated pyramid-shaped raised portions 31 are consequently produced, cf. FIGS. 12 and 13. However, it is also possible that the matrix itself was shaped from the crystalline substrate and the polymer substrate is shaped subsequently from this matrix in order to reproduce exactly the shape of the crystalline substrate. The shaping can be effected for example respectively by casting or imprinting of the crystalline substrate or of the matrix. Further reshaping methods are for example hot-embossing and nano-imprint.

As represented in FIGS. 5-8, firstly a metallic layer 31 forming the mirror surface is deposited on the second and fourth surface region 27, 29, subsequently a first part of the outer layer 21 and also of the layer 9 is deposited on the first, second and fourth surface region 26, 27, 29. Thereafter, the waveguide core 20 is deposited on the first surface region 26. Subsequently, a remaining part of the outer layer 21 and of the layer 9 is deposited on the first, second and fourth surface region 26, 27, 29 and also on the waveguide core 20. In principle, known techniques, such as for instance sputtering, masking and etching, can hereby be used. In addition, it is in principle possible during implementation of the method that in addition further structures are produced on or in the carrier 25, in particular by means of the mentioned techniques. For example, limit stop structures 33, see FIG. 9, can be produced, for example in the form of depressions, for example by etching, or by raised portions, for example by deposits.

In FIG. 9, the optical coupling system 1 shown in FIG. 1 is represented in a view from above. It is in principle possible that a plurality of light guides 5 of the described type is provided. These can have curves along the main plane 4 and for example have a U-shaped configuration so that two end pieces 23 of such light guides 5 point towards the mirror surface 6, as described.

The optical coupling system 1 shown in FIG. 10 comprises the optical coupler 2 shown in FIG. 1. The coupler 2 could for example be configured also like the examples shown in FIGS. 2-4 or differently. The coupling system 1 comprises in addition an optoelectronic component 34, for example a photodetector or a surface emitter (VCSEL) which is connected to the optical coupler, for example by flip-chip bonding. The component 34 is disposed relative to the outer surface of the optical coupler 2 such that the light beam coming from the optical coupler from the light guide 5 can be coupled into the component 34 or such that a light beam coming from the optoelectronic component 34 is coupled into the optical coupler 2 and into the light guide 5.

The optical coupling system 1 shown in FIG. 11 comprises the optical coupler 2 shown in FIG. 1. The coupler 2 could also be configured like the examples shown in FIGS. 2-4 or differently. The coupling system 1 comprises in addition a further optical coupler 35 of the type shown in FIG. 1. Also this coupler 2 could be configured also like the examples shown in FIGS. 2-4 or differently. The further optical coupler 35 is orientated relative to the first-mentioned coupler 2 such that the light beam enters through the outer surface 7 of the further optical coupler 35 into the further coupler 35, impinges on the mirror surface 6 of the further coupler 35, is reflected on this mirror surface 6 and the light beam reflected on this mirror surface 35 is irradiated into the light guide 5 of the second optical coupler 35. Of course, also a reversed beam course is likewise possible.

As indicated in FIGS. 10 and 11, the external medium 3 is disposed between the outer surface 7 of the optical coupler 2 and an outer surface 36 of the optoelectronic component or of the outer surface 7 of the further optical coupler 34, orientated towards the optical coupler 2. The external medium 3 in this way completely fills an intermediate region which is defined by these outer surfaces 7, 36.

In FIGS. 12 and 13, an optical coupling system 1 of the type proposed here is represented schematically in a view from above. It comprises a large number of optical couplers 2 of the type proposed here. Each of these couplers can be constructed and configured in its cross-section, for example as shown and explained with reference to FIGS. 1-4. These couplers 1 are divided into a common carrier 25 and are disposed adjacently on the surface thereof. The surface has the raised portions 31 already described above, the side faces of which respectively represent the mentioned second surface region 27 and on which the mirror surfaces 6 of the couplers 2 are disposed. On the surface of the carrier 25 in addition a large number of light guides 5 are disposed, each of the light guides 5 approaching precisely one of the mirror surfaces (and possibly ending thereon, cf. FIGS. 1-3), as represented in the detailed view of FIG. 13.

REFERENCE NUMBER LIST 1 optical coupling system
2 optical coupler
3 external medium
4 main plane
5 light guide
6 mirror surface
7 outer surface
8 light beam
9 layer
10 interface of the layer
11 interface of the layer
12 layer arrangement
13 further layer
14 further layer
15 interface
16 interface
17 interface 18 interface
19 further interface
20 waveguide core
21 outer layer
22 outer layer
23 end piece
24 curve
25 carrier
26 first surface region
27 second surface region
28 third surface region
29 fourth surface region
30 depression
31 raised portion
32 metallic layer
33 limit stop structure
34 component
35 further optical coupler
36 outer surface of the component

What is claimed is:

1. An optical coupling system comprising:
an optical coupler and a light-transmissive external medium,
the optical coupler comprising a light guide which extends parallel to a main plane of the optical coupler, a mirror surface which is inclined relative to the main plane by an angle of inclination and an outer surface of the coupler which borders the medium, the light guide, the mirror surface and the outer surface of the coupler being orientated such that a light beam emerging from the light guide is reflected on the mirror surface and, at a coupling angle defined relative to the main plane, exits through the outer surface from the coupler into the external medium or in that, at the coupling angle, it enters through the outer surface from the external medium into the coupler, is reflected on the mirror surface and subsequently is coupled into the light guide,
wherein between the mirror surface and the outer surface of the coupler, a light-transmissive layer with an optical refractive index is disposed such that the light beam is refracted and deflected at at least one of the outer interfaces of the light-transmissive layer, the angle of inclination and the optical refractive index, being chosen as a function of an optical refractive index of the external medium such that the coupling angle is in a range between 88° and 92°, wherein the at least one of the outer interfaces of the light transmissive layer at which the light beam is refracted and deflected is orientated parallel to the mirror surface.

2. The optical coupling system according to claim 1, wherein the external medium is a gas, for example air, a liquid or a solid material, for example a polymer.

3. The optical coupling system according to claim 1, wherein the angle of inclination deviates from 45° by at least 1° and preferably has a value between 40° and 60°, for example 54.7°.

4. The optical coupling system according to claim 1, wherein the light-transmissive layer borders the outer surface and/or on the mirror surface in an areal manner.

5. The optical coupling system according to claim 1, wherein the light-transmissive layer is part of a layer arrangement which comprises further light-transmissive layers, the layer arrangement bordering the outer surface and the mirror surface respectively in an areal manner, each of the light-transmissive layers of the layer arrangement having respectively two outer interfaces which extend parallel to the mirror surface and to the outer surface.

6. The optical coupling system according to claim 1, wherein the light guide is orientated to emit the light beam parallel to a plane spanned by a surface normal of the main plain and a surface normal of the mirror surface.

7. The optical coupling system according to claim 1, wherein the light guide is orientated to beam the light beam through a further outer interface of the layer into the layer, the further outer interface of the layer bordering directly the light guide.

8. The optical coupling system according to claim 4, wherein the optical refractive index of the light-transmissive layer, the optical refractive index of the external medium and the angle of inclination fulfil the equation $n_1/n_2 = \tan(\alpha)$.

9. The optical coupling system according to claim 1, wherein the light guide comprises a waveguide core which guides the light beam and also at least one outer layer which borders the waveguide core, an optical refractive index of the waveguide core being the same as the optical refractive index of the light-transmissive layer or an optical refractive index of one of the at least one outer layer being the same as the optical refractive index of the light-transmissive layer.

10. The optical coupling system according to claim 1, wherein the optical coupler has a carrier, the surface of which comprises a first surface region which is disposed parallel to the main plane and a second surface region which is disposed parallel to the mirror surface.

11. The optical coupling system according to claim 10, wherein the first surface region of the carrier abuts on the second surface region.

12. The optical coupling system according to claim 1, wherein the carrier has a third surface region which extends parallel to the first surface region and is raised relative thereto, the carrier having in addition a fourth surface region which is inclined relative to the main plane and which is disposed between the first and the third surface region and borders on the first and third surface region.

13. The optical coupling system according to claim 1, wherein:
the carrier, in its surface, has a depression, a base of the depression being the first surface region and a side face of the depression being the second surface region, or
in that the carrier, on its surface, has a raised portion, the first surface region bordering the raised portion and a side face of the raised portion being the second surface region.

14. The optical coupling system according to claim 1, wherein the carrier is a crystalline substrate, for example a silicon substrate, or a polymer substrate.

15. The optical coupling system according to claim 14, wherein the main plane extends parallel to a first lattice plane of the crystalline substrate, for example parallel to a lattice plane of the silicon substrate, and in that the mirror surface extends parallel to a second lattice plane of the crystalline substrate, for example parallel to a lattice plane of the silicon substrate.

16. The optical coupling system according to claim 1, wherein the optical coupling system further comprises:
an optoelectronic component which is connected to the optical coupler and is disposed relative to the outer surface of the optical coupler such that the light beam coming from the optical coupler is coupled into the optoelectronic component or in that a light beam coming from the optoelectronic component is coupled into the optical coupler, or
a further optical coupler, the further optical coupler being orientated relative to the optical coupler such that the light beam enters through the outer surface of the further optical coupler into the further optical coupler, impinges on the mirror surface of the further optical coupler, is reflected on this mirror surface and the light beam reflected on this mirror surface is irradiated into the light guide of the further optical coupler.

17. The optical coupling system according to claim 16, wherein the external medium is disposed between the outer surface of the optical coupler and an outer surface of the optoelectronic component which is orientated towards the optical coupler, the external medium filling an intermediate region defined by these outer surfaces preferably completely.

18. The optical coupling system according to claim 16, wherein the optoelectronic component is a surface emitter, for example a VCSEL, or a photodetector.

19. A method for the production of an optical coupling system, the method comprising:
  producing the optical coupling system having an optical coupler and a light-transmissive external medium,
    the optical coupler comprising a light guide which extends parallel to a main plane of the optical coupler, a mirror surface which is inclined relative to the main plane by an angle of inclination and an outer surface of the coupler which borders the medium,
    the waveguide, the mirror surface and the outer surface of the coupler being orientated such that a light beam emerging from the light guide is reflected on the mirror surface and at a coupling angle defined relative to the main plane, exits through the outer surface from the coupler into the external medium or in that, at the coupling angle, it enters through the outer surface from the external medium into the coupler, is reflected on the mirror surface and subsequently is coupled into the light guide,
    wherein between the mirror surface and the outer surface of the coupler, a light-transmissive layer with an optical refractive index is disposed such that the light beam is refracted and deflected at at least one of the outer interfaces of the layer, the angle of inclination and the optical refractive index, being chosen as a function of an optical refractive index of the external medium such that the coupling angle is in a range between 88° and 92°;
  and processing, for the production of the mirror surface which is inclined relative to the main plane, the surface of a crystalline substrate, for example of a silicon substrate, by anisotropic etching so that a first planar surface region of the crystalline substrate extends parallel to a first lattice plane of the crystalline substrate and a second surface region which borders the first surface region extends parallel to a second lattice plane of the crystalline substrate.

20. The method according to claim 19, wherein the crystalline substrate is used as carrier of the optical coupler or in that a polymer substrate is shaped from a matrix, the matrix being the crystalline substrate or having been shaped itself from the crystalline substrate, for example by casting or imprinting of the crystalline substrate or of the matrix, the shaped polymer substrate being used subsequently as carrier for the optical coupler.

21. The method according to claim 19, wherein the light guide and/or the layer are produced by applying deposition methods and/or etching methods to the carrier.

22. The method of claim 19, further comprising:
  operating the optical coupling system so that:
    a light beam which emerges from the light guide is irradiated into the layer and, in its further beam course, is reflected on the mirror surface, the light beam, in its beam course, being refracted and deflected at at least one of the outer interfaces of the layer and subsequently emerging through the outer surface from the optical coupler into the external medium,
    or in that a light beam which includes the coupling angle with the main plane is irradiated through the outer surface into the optical coupler, the light beam, in its subsequent beam course, being refracted and deflected at at least one of the outer interfaces of the layer, the light beam being reflected on the mirror surface and subsequently being coupled into the light guide.

23. The method of claim 19, wherein the at least one of the outer interfaces of the light-transmissive layer at which the light beam is refracted and deflected is orientated parallel to the mirror surface.

* * * * *